April 1, 1969 R. C. WICKER 3,436,149
CHASE ADAPTER FOR PHOTOCOMPOSING
Filed Nov. 22, 1965

INVENTOR.
RALPH C. WICKER,
BY
*G. P. Leeper*
ATTORNEY

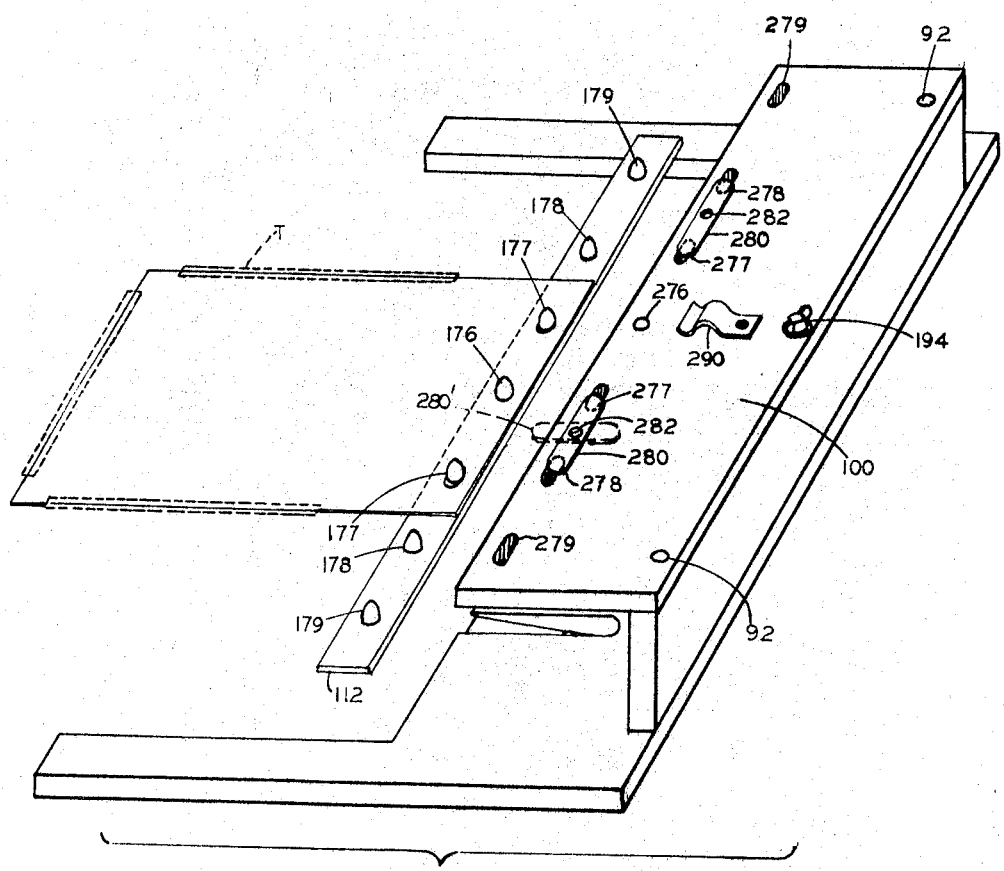
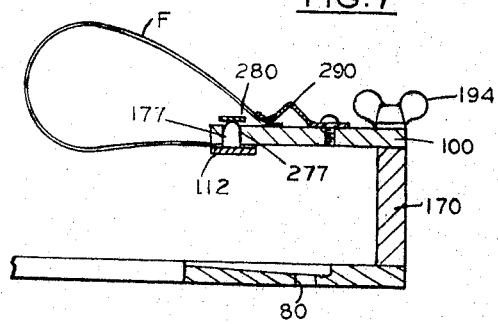
FIG. 7
FIG. 6
INVENTOR.
RALPH C. WICKER.
BY
F. P. Keiper
ATTORNEY

United States Patent Office 3,436,149
Patented Apr. 1, 1969

3,436,149
CHASE ADAPTER FOR PHOTOCOMPOSING
Ralph C. Wicker, Rochester, N.Y., assignor to Wicker Research, Inc., Rochester, N.Y., a corporation of New York
Filed Nov. 22, 1965, Ser. No. 509,030
Int. Cl. G03b 27/02, 27/32, 21/00
U.S. Cl. 355—85                                                                 7 Claims

ABSTRACT OF THE DISCLOSURE

An adapter for a photocomposing chase having register pins for precision location on the chase support mechanism of a photocomposing apparatus, the chase having a frame, and a glass plate to which negatives may be adhesively taped. The adapter consists of a rigid plate having apertures therein for precision engagement with the chase register pins thereby locating the adapter in fixed relation with the chase, a thin plate extending from the rigid plate to a marginal edge of the glass plate of the chase and having a plurality of aligned upstanding pins adjacent an edge thereof to temporarily receive a negative having an accurately punched marginal edge corresponding to the pins, and a mechanism to increase the spacing between the plates to facilitate placement and removal of the adapter from the chase.

---

This invention relates generally to lithography printing, and photocomposing machines used in connection therewith and more particularly to the registry of film in respect to the negative holders referred to as chases, employed in such machines.

Photocomposing machines include a support or backboard for a printing plate and support mechanism for a negative holder, adapted to locate a negative holder in any predetermined position over the plate, for plate exposure. Each printing plate is punched along its edges for registry when mounted on the backboard, and each negative holder is provided with pins for registry with the negative holder support mechanism so that accurate location of the holder in reference to any desired location over the plate is obtainable.

In color printing, a separate printing plate is prepared for each color from a plurality of sets of negatives, each set of which includes one negative for each color to be printed. The location of one negative of a set, over its respective color plate during exposure must correspond to the location of each of the other negatives of the set over their respective plates during exposure, so that the printing plates when locked into the printing machine will apply their respective images successively to the work in perfect register. The importance of a perfect register may be appreciated when it is considered that the dot periodicity of color lithographic work may be as high as 150 or even 300 to the inch.

The accurate location of a negative film upon the glass plate of a negative holder or chase has been performed upon a register device having a ground glass screen with vertical and horizontal center lines, and a frame provided with means to receive the negative holder registry pins. The negative holder comprises an outer frame carrying the registry pins, and an inner frame adjustable within the outer frame, whereby the guide lines on each negative may be brought into alignment with the center lines of the register device ground glass, by shifting the inner frame. In this manner each color negative of a set while taped to the glass of a negative holder is accurately positioned with reference to the holder registry pins. By the foregoing cumbersome method each negative of a multicolor set is superimposed over a printing plate, for exposure thereof while accurately located by the composing machine, and a multicolor set of printing plates thus produced.

The present invention is directed to a register device adapter, constructed so as to receive the pins of a negative holder or chase, and having pins adapted to in turn engage the punched marginal edge of a negative film, masters, and the like whereby, by employing accurately punched film, such film will automatically be accurately located upon the glass plate of the negative holder, by applying the marginal punched film edge to the pins of the adapter device temporarily. While thus located, the film is secured to the glass plate of the negative holder by applying adhesive tape, along the film edges. Thus by employing the adapter, and punching all film along one edge for accurate application on the adapter pins, each negative (or positive) of a color set can be accurately located on a negative holder through temporary use of the adapter, during which the film is secured to the glass plate by adhesive tape. In this manner each film or negative of a set is located in exactly the same position on the negative holder, with reference to the negative holder pins, which locate the holder with reference to the holder support mechanism of the composing machine.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 6 is a sectional view of an adapter, modified in respect to the pins registering with the punched film; and FIGURE 7 is a perspective exploded view of parts of the modified form of FIGURE 6.

Figure 1:
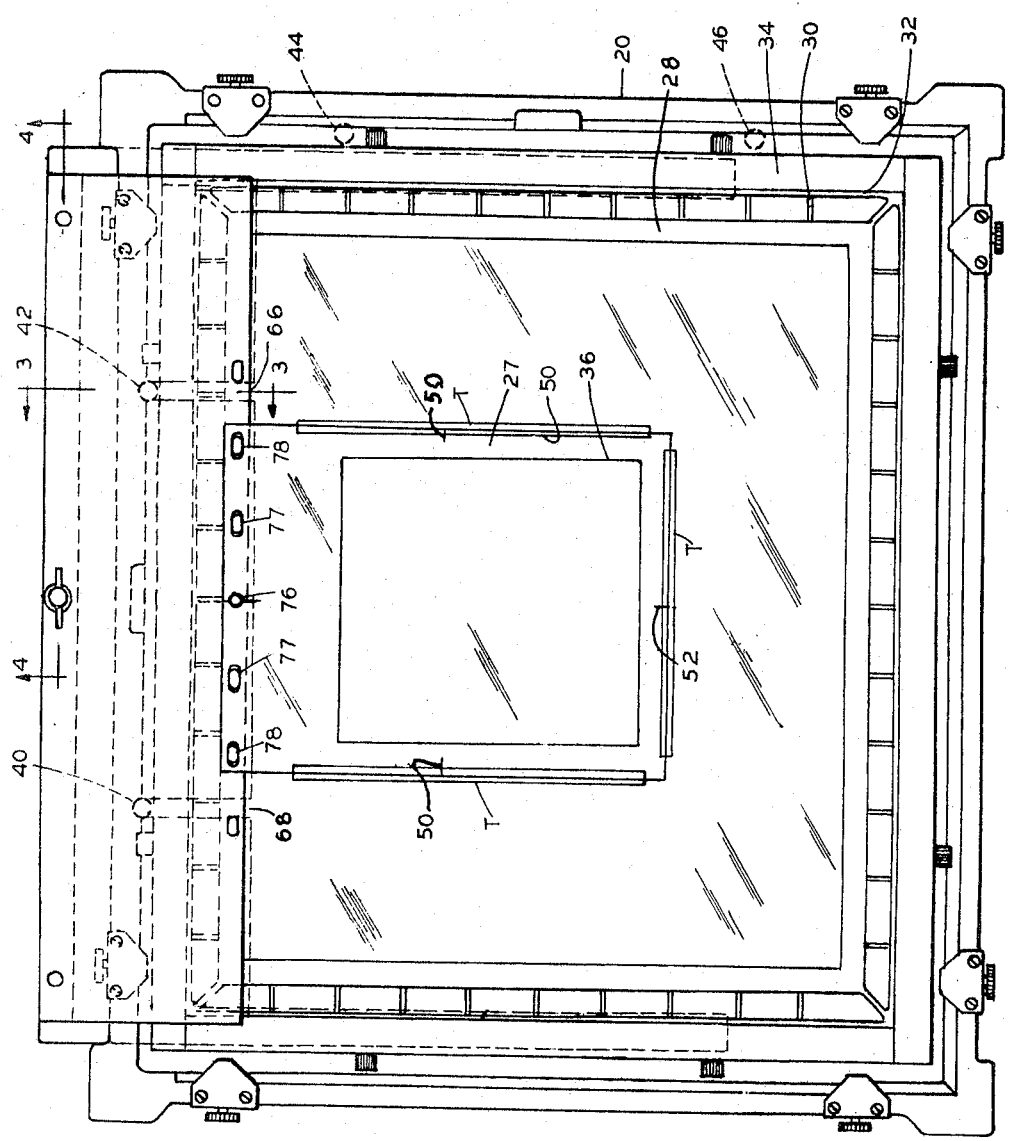
FIGURE 1 is a plan view of a chase locked in register with an adapter.
Figure 2:
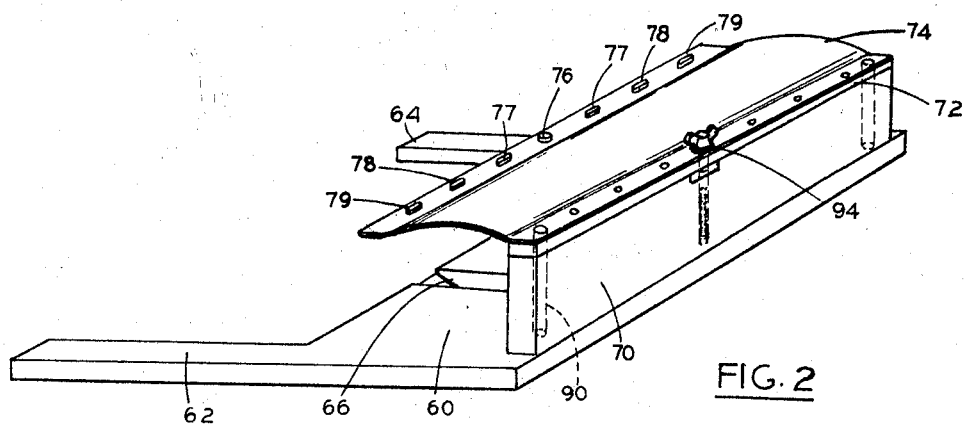
FIGURE 2 is a perspective view of the adapter of FIGURE 1.
Figure 3:
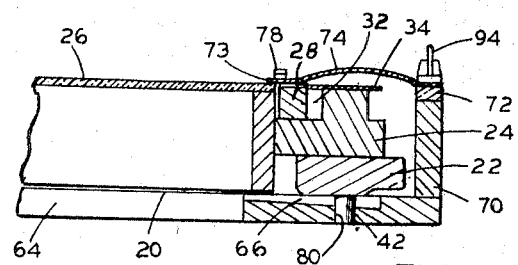
FIGURE 3 is a sectional view taken on the line 3—3 of FIGURE 1.
Figure 4:
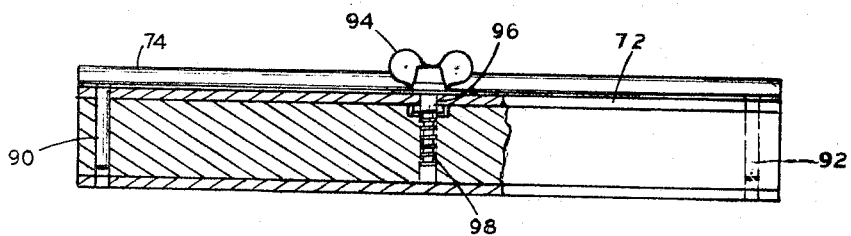
FIGURE 4 is a perspective view of the adapter.

Referring to FIGURE 1, there is shown a typical chase or negative holder 20, comprising an outer frame 22, an inner frame 24 that is adjustable in the plane of and with reference to the outer frame, and which is provided with a glass plate 26, upon which negative film 27 (or positive) is to be mounted. The glass plate 26 is surrounded by a frame 28 having a plurality of grooves 30 for the passage of air from the glass plate area to the perimetral vacuum channel 32 located immediately outward of the frame 28, but inwardly of the rubber gasket or flap seal 34 of the inner frame 24. So far as the present invention is concerned, the adjustable feature between the frames 22 and 24 is rendered unnecessary and the tedious work involved heretofore in adjusting one frame in respect to the other is eliminated, and the two frames are fixed against relative movement, and could as well be a single frame. The film may have a half tone image 36 corresponding to one color of a set, which is to be applied over a printing plate for exposure. Any combination of film may be applied to the glass 26, and in practice, the areas other than the image area will be masked, as is well understood in the art.

On the other side of the chase are register pins 40 and 42 along one longitudinal portion of the outer frame 22 of the chase, and also register pins 44 and 46 along one transverse portion of the outer frame. The pins 40 and 42 are precisely located and exactly spaced, to interlock with the chase holder support mechanism of the composing machine to exactly locate the chase upon the composing machine chase support mechanism. Similarly the pins 44 and 46 are precisely located and have the exact same spacing as the pins 40 and 42, and either the pins 40 and 42 engage the chase holder support mechanism of the composing machine, when the chase is positioned horizontal, or the pins 44 and 46 engage the chase holder of the composing machine, when the chase is positioned vertically.

It has heretofore been the practice to employ the pins 40 and 42, or 44 and 46 for locating the chase over a ground glass screen having longitudinal and transverse center lines of a register device, and providing each film such as 27 with longitudinal and transverse center lines, as for example indicated at 50 and 52. By aligning the film center lines with the ground glass center lines, through careful adjustment of the location of frame 24 within frame 22, a precise location of the film, previously taped to the glass plate of the chase was obtained, with respect to the register pins 40 and 42, or 44 and 46, so that each film of a color set could be precisely located upon a chase, such that exposures of the films when applied to their respective printing plates would be in exact register.

The present invention avoids such adjustment, through the provision of film having identically punched edges, and the use of an adapter having film locating pins cooperating with punched film, and in addition, apertures adapted to accurately receive the register pins 40 and 42, or 44 and 46 of a chase.

Such adapter comprises a base having a transverse portion 60 and spaced side arms 62 and 64, which may if desired be mounted on a work table having a ground glass screen disposed in the area between the arms 62 and 64. The transverse portion is provided with two gradually deepening parallel grooves 66 and 68 of a width slightly greater than the diameter of the register pins 40 and 42, and spaced apart exactly the same as the spacing of the pins 40 and 42, or 44 and 46, either of which pair have the same spacing. Along the length of said slots are apertures as at 80 adapted to accurately receive the pins 40 and 42, or 44 and 40 of a chase. Along one edge of the base is an upright elongate pedestal 70. Secured to the upper edge of the pedestal, or to a bar such as 72, which may be elevated and lowered, is a thin resilient plate 74 overhanging the base, and adapted to have its outboard edge engage the edge of the glass of a chase, whose pins 40 and 42, for example are disposed in the apertures 80.

Adjacent the outboard edge and projecting upwardly from the surface of said plate is a centering pin 76 and similarly disposed pins 77, 78 and 79 on either side thereof, which if desired may be of rounded oblong or square or rectangular section. All of such pins are about an eighth of an inch or less in height, and the center pin 76 is on a center line midway between the grooves 66 and 68 and the register pin apertures 80.

Figure 5:
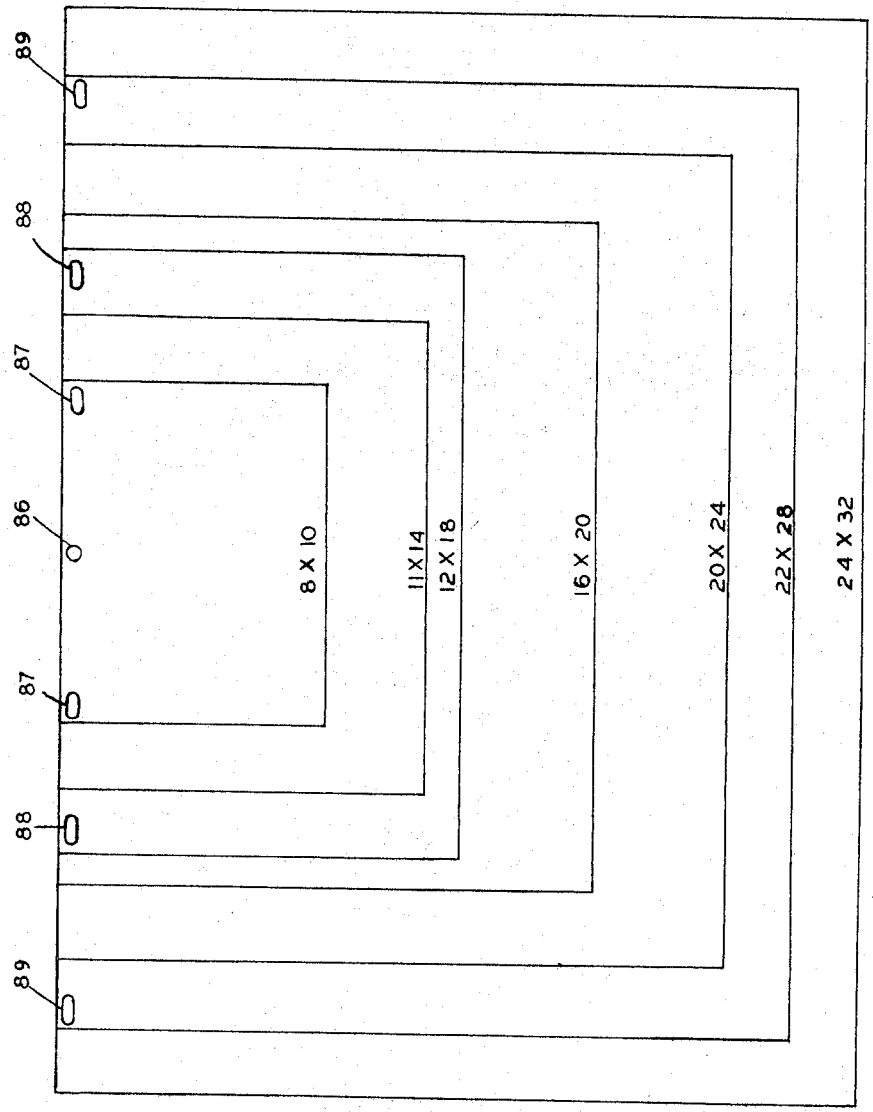
FIGURE 5 is an illustration of film sizes showing the apertures punched therein for engaging the adapter pins.

The location of the lateral pins is such as to accommodate a variety of film sizes such as shown in FIGURE 5, having accurately punched apertures along one edge. In practice an 8 x 10 or 11 x 14 film will be punched to engage but the center pin 76 and the adjacent pins 77, whereas film sizes 12 x 18 and 16 x 20, and 20 x 24 will be punched to engage the center pin and lateral pins 77 and 79, but are slotted lengthwise to accommodate any all seven pins 76, 77, 78 and 79.

The center punched hole 86 of the film will accurately fit the center pin 76, and the holes 87, 88 and 89 will be aligned with pin 76, and of the same width as pins 77, 78 and 79, but are slotted lengthwise to accommodate any lateral shrinkage or expansion of the film due to climatic conditions or otherwise. It is suffice to say that pin 76 locates the film, while the other pins, whether pins 77, or all of them, serve to accurately orient the film.

In order to permit the insertion of a chase into position in the adapter, with its pins 40 and 42 (or 44 and 46) seated in the apertures 80, it is preferable to lift the plate 74 somewhat, to clear the gasket. For this purpose the bar 72 is provided with pins 90 and 92 accurately slidable in apertures in the pedestal 70. Means to elevate the bar 72 temporarily while inserting the frame of a chase in position, comprises a thumb screw 94, extending through a central aperture 96 in bar 72, and screw threaded in an aperture 98 in the pedestal 70.

The thumb scew has thrust collars on either side of the bar 72, and on rotation of the thumb screw, the bar may be elevated or lowered. When elevated, adequate clearance to insert or remove the frame of a chase is provided, and when a chase is in position, with its pins 40 and 42 in the apertures 80, lowering of the bar brings the outboard edge 73 of the plate 74 down upon the marginal edge of the glass plate of the chase.

If desired the adapter may be constructed as indicated in FIGURE 6, wherein the bar 72 and thin plate 74 are made in one rigid piece comprising a relatively heavy plate 100 adapted to be raised or lowered over the edge of the glass plate and frame of a chase as by the thumbscrew 194, in the same manner as bar 72. When so constructed, the edge of the plate 100, instead of having upstanding pins, will be provided with seven apertures 276, 277, 277, 278, 278, 279 and 279, aligned and spaced in exact accordance with the apertures of the punched film. In order to provide accurate register of the film, a separate thin bar 112 having upstanding pins such as 176, 177, 177, 178, 178, and 179, 179 is provided, which pins are adapted to extend upwardly through the punchings in the film, and thence into the apertures 276–279 of the plate 100. The seven pins 176–179 will preferably be of bullet shape, and of sufficient length to project snugly into the apertures 276–279 when plate 100 is lowered with the film edge clamped between plate 100 and bar 112. The pins may be made of a length greater than the thickness of the plate 100, so that leaf springs 280, pivotally secured to plate 100 as at 282, will resiliently engage the tips of a number of the pins, when the plate is lowered to clamp the film between the pin bar 112 and plate 100. The leaf springs 280 will thereby tend to release the pin bar from the plate, when the plate 100 is lifted. Such leaf springs may be turned as at 280′, when assembling the bar 112 and film upon the plate 100.

One or more spring clips such as 290 may be mounted on the plate 100, to hold the remote end of the film when curled upwardly out of the way, when its punched end is disposed on the pins of bar 112, and the pins of such bar are held in the apertures of plate 100, awaiting the insertion of a chase into registry position with the adapter. As before the center pin 176, and aperture 276 will be circular and a close fit, and the remaining pins may be circular, while the apertures 277–279 are rectangular, to provide a close fit in one direction only to orient the film and strip. In the same manner as before, the film perforations except for the center will be elongate.

The present invention has been described in reference to the chase employed in connection with the photocomposing machines of the Lanston Monotype Company, in which the register pins 40 and 42, and 44 and 46 project from the reverse side of the chase from the glass plate side. In photocomposing machines of the Rutherford type, wherein the register pins project upwardly from the frame, so as to be accessible from the glass plate side, it is merely necessary to provide an adapter frame with apertures to mate with the register pins, which frame is provided with an adapter plate adapted to extend to the edge of the glass plate of the chase. The adapter plate has film pins adapted to engage the accurately punched film; or pin recesses to receive the pins of strip such as 112.

Any suitable apparatus for accurately punching the film to correspond to the pins of the adapter may be provided, it being preferable to provide a punch capable of punching all holes simultaneously and equipped with a vacuum base to hold the film flat while being punched.

It will be seen that with the present invention, when the adapter is locked in with the pins of a chase, a film or negative (or positive) may be applied to the pins of the adapter, and thus located in a preset position over the glass plate of the chase. While so located the film is taped to the plate along three sides as at T. Thereafter the upper perforate edge of the film is lifted from the pins and the adapter removed, after which the upper edge of the film is taped to the glass plate. In the form shown in FIGURES 1-5, the film edge is lifted from the shallow pins 76-79, after which the adapter is removed, the adapter having served its purpose. In FIGURES 6 and 7, the adapter plate 100 is lifted from the pins 176-179 of the strip 112, after which the strip 112 can be removed by lifting the untaped edge of the film or negative, following which the upper film edge is also taped to the glass of the chase. In either case, once the film is taped along three sides to the glass plate, the adapter has served its purpose to locate the film. Thereafter upon release of the film apertures from the adapter pins, the chase and the adapter are separated from one another, and the adapter made ready for a subsequent application to the chase after exposure and stripping, or another chase. It can be seen that if all negatives of a color set are punched alike, register is assured.

While a single form and a variation of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. An adapter for a photocomposing chase having register means for precision location on the chase support mechanism of photocomposing apparatus, the chase having a frame, and a glass plate to which negatives may be adhesively taped, said adapter comprising, rigid means adapted to extend along one side of a chase and adapted for precision engagement with the chase register means for locating the adapter immovably with respect to the chase in any direction lying in the plane of the glass of the chase, said adapter including as a part thereof plate means adapted to extend from said rigid means over the side edge of a chase to a marginal edge of the glass plate of the chase, said plate means having affixed thereto a plurality of aligned upstanding pins adjacent an edge thereof adjacent the edge of the glass plate, said pins being adapted to temporarily receive a negative having an accurately punched marginal edge corresponding to said pins.

2. An adapter according to claim 1 having means to temporarily increase the spacing between the plate means and the precision engagement means to facilitate the location of a portion of the frame of a chase therebetween.

3. An adapter according to claim 1, wherein the plate means comprises a relatively thin plate, and a series of upstanding short pins along the edge thereof for receiving a film having a correspondingly punched edge.

4. An adapter according to claim 3 wherein the adapter is provided with means to temporarily increase the spacing between the plate means and the precision engagement means.

5. An adapter for a photocomposing chase having register means for precision location on the chase support mechanism of photocomposing apparatus, the chase having a frame, and a glass plate to which negatives may be adhesively taped, said adapter comprising, means for precision engagement with the chase register means for locating the adapter immovably with respect to the chase in any direction lying in the plane of the glass of the chase, said adapter including as a part thereof rigid plate means adapted to extend to a marginal edge of the glass plate of the chase, said plate means comprising a relatively rigid plate having apertures along the edge substantially in accordance with the apertures of punched film to be applied to the chase glass, and a thin strip having upstanding pins adapted to be projected up through the punched edge of a film, and into the apertures of the rigid plate, to hold a film in fixed position over the glass of a chase to which the adapter is applied.

6. An adapter according to claim 5 wherein the adapter is provided with means to temporarily increase the spacing between the rigid plate and the precision engagement means.

7. An adapter according to claim 6 wherein the pins of the strip are of bullet shape and of greater length than the thickness of the film and rigid plate, and wherein resilient means are applied to the plate to bear yieldingly against the pin ends, when projected into the rigid plate apertures.

References Cited

UNITED STATES PATENTS

| 2,290,292 | 7/1942 | Neu | 95—73 |
| 3,000,737 | 9/1961 | Barnhart | 88—24 XR |
| 3,264,106 | 8/1966 | Alldis | 95—73 XR |

NORTON ANSHER, *Primary Examiner.*

FRED L. BRAUN, *Assistant Examiner.*

U.S. Cl. X.R.

355—75